United States Patent [19]

Spykerman et al.

[11] Patent Number: 5,318,343
[45] Date of Patent: Jun. 7, 1994

[54] CONTAINER HOLDER

[75] Inventors: David J. Spykerman, Holland; Scott S. Bainbridge, Byron Center, both of Mich.

[73] Assignee: Prince Corporation, Holland, Mich.

[21] Appl. No.: 837,238

[22] Filed: Feb. 14, 1992

[51] Int. Cl.⁵ .................................................. A47C 7/62
[52] U.S. Cl. ...................................... 297/194; 297/188
[58] Field of Search ................................. 297/194, 188; 248/311.2, 313, 293; 224/273, 275

[56] References Cited

U.S. PATENT DOCUMENTS

| | | | |
|---|---|---|---|
| 2,502,383 | 3/1950 | Loewy | 297/194 X |
| 2,649,270 | 8/1953 | Franks . | |
| 4,759,584 | 7/1988 | Dykstra et al. | 297/194 |
| 4,783,037 | 11/1988 | Flowerday | 248/311.2 |
| 4,818,017 | 4/1989 | Dykstra et al. | 297/194 |
| 4,828,211 | 5/1989 | McConnell et al. | 248/311.2 |
| 4,907,775 | 3/1990 | Lorence et al. | 297/194 X |
| 4,928,865 | 5/1990 | Lorence et al. | 297/194 X |
| 4,953,771 | 9/1990 | Fischer et al. | 297/194 X |
| 4,981,277 | 1/1991 | Elwell | 248/311.2 |
| 4,984,722 | 1/1991 | Moore | 248/311.2 X |
| 5,007,610 | 4/1991 | Christiansen et al. | 248/311.2 |
| 5,072,909 | 12/1991 | Huzang | 248/311.2 |
| 5,167,392 | 12/1992 | Henricksen | 248/311.2 |

FOREIGN PATENT DOCUMENTS

| | | |
|---|---|---|
| 443562 | 4/1927 | Fed. Rep. of Germany . |
| 3143957 | 5/1983 | Fed. Rep. of Germany ...... 297/194 |
| 2102841 | 11/1988 | Japan . |

OTHER PUBLICATIONS

Exhibit A discloses a cupholder used in a 1989 Lexis automobile.
Exhibit B discloses a cupholder used in a 1990 Toyota automobile.

*Primary Examiner*—Kenneth J. Dorner
*Assistant Examiner*—Milton Nelson, Jr.
*Attorney, Agent, or Firm*—Price, Heneveld, Cooper, DeWitt & Litton

[57] ABSTRACT

A container holder includes a support having a recess therein, a cover assembly pivotally mounted to the support member and adapted to cover the recess and provide at least a portion of a container support floor when in an open position. In a preferred embodiment the support member includes a floor which is aligned with the floor of the cover assembly to support a container thereon. In a preferred embodiment also, a pair of collapsable arms extend from the cover assembly and move between a use position for supporting the sides of a container and a collapsed stored position in the recess when the cover assembly is in a closed position.

24 Claims, 3 Drawing Sheets

CONTAINER HOLDER

BACKGROUND OF THE INVENTION

The present invention relates to container holders for vehicles, and in particular to ones which fold between open and closed positions.

With the downsizing of vehicles and the increasing time spent in vehicles, container holding devices have become increasingly important to consumers. In particular, consumers are desirous of holders for drinking cups, pop cans, and coffee mugs that both securely hold the containers and also place them in a convenient accessible location for easy retrieval. Several container holders have been designed for this purpose. However, further improvements are desired. Container holders that provide a stable and secure bottom support for the containers with a minimum of secondary moving parts are desirable since such structures tend to be longer lasting in service and also less expensive to manufacture and assemble. Also, it is desirable to position the containers in a partially protected position over the front edge of an armrest where the containers are located far enough forward to facilitate easy use as a person rests their arm on the armrest, yet far enough rearward not to interfere with a floor mounted transmission shifter on the vehicle. Still further, it is desirable to store the container holding mechanism when not in use without requiring excessive space.

SUMMARY OF THE INVENTION

The present invention provides a container holder for a vehicle including a support member having a recess and defining at least a portion of a container bottom support surface, and a cover assembly pivotally mounted to the support member and defining another portion of a container supporting surface located to support the bottom of a container. In the preferred embodiment, two opposing arms are movably mounted to the cover assembly and define in part two container supporting apertures. The arms collapse to a compact storage position in the recess when the cover assembly is pivoted from an open use position to a closed storage position in which the cover assembly aesthetically covers the recess.

The invention provides several advantages over known prior art. Initially, the invention provides a compact and attractive container holder that is locatable in a recess over the front edge of a structure such as an armrest. Thus, a container placed in the container holder can be supported in part by the floor of the recess, and also partially protected by the sides of the recess. Further, the container holder can be pivotally coupled to the support structure to pivot into the recess for compact storage, while simultaneously covering the recess. The arrangement thus provides a secure and convenient support for a container while minimizing the number of and complexity of moving parts.

These and other features, objects, and advantages of the present invention will become apparent upon reading the following description thereof together with reference to the accompanying drawings.

DETAILED DESCRIPTION OF THE PREFERRED EMBODIMENT

Figure 1:
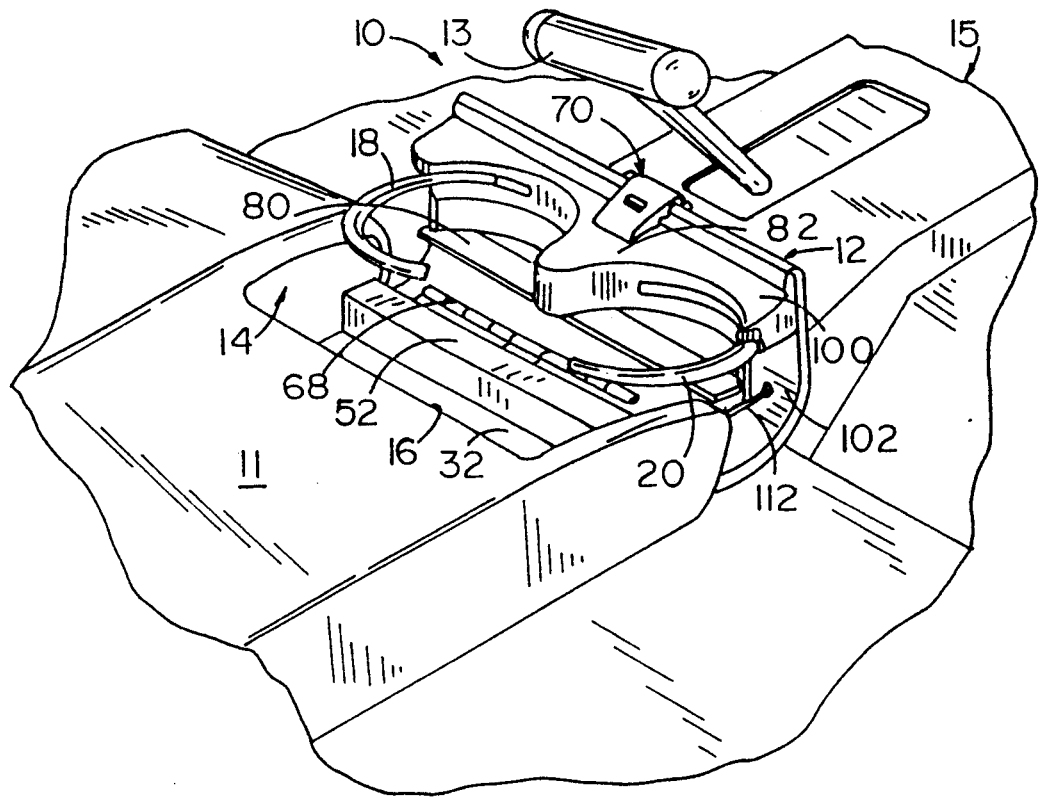
FIG. 1 is a perspective view of a container holder embodying the present invention shown in an open use position.

Referring initially to FIG. 1, there is shown a container holder 10 embodying the present invention which is adapted for mounting in an armrest 11 of a vehicle 15 such as an automobile. In the preferred embodiment, cupholder 10 is particularly adapted to fit at the forward edge of the armrest 11 between the vehicle front seats (not shown) in a receptacle tray 14 (FIG. 5) mounted in the forward end of the armrest, although it could be used in other areas. In this forward position, cupholder 10 positions a container such as a drinking cup (not shown) in a readily accessible and convenient location to be grasped as a person's arm rests on armrest 11. Also in this position, the drinking cup is securely supported directly over the front edge of armrest 11 and protected by the sides of receptacle 14, but located rearwardly far enough so as not to interfere with the movement of the floor mounted transmission shift lever 13.

Figure 2:
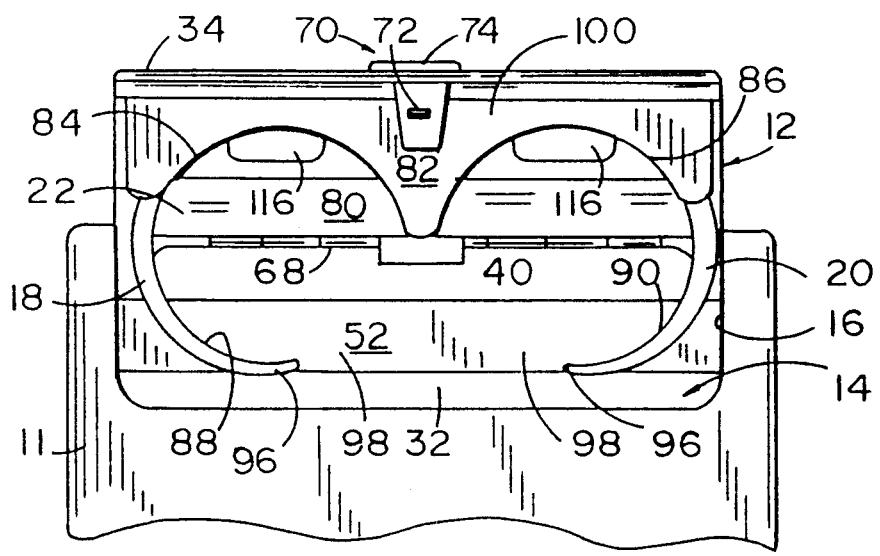
FIG. 2 is a top plan view of the container holder shown in FIG. 1.
Figure 4:
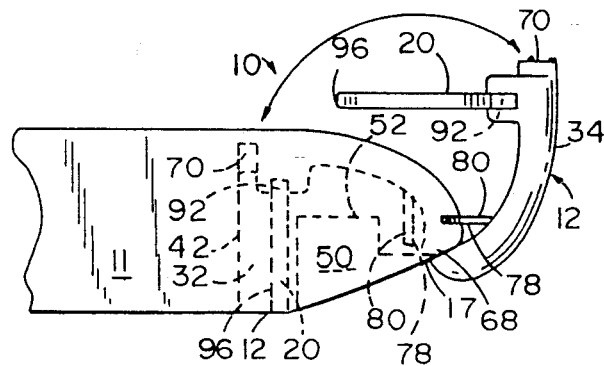
FIG. 4 is a right side view of the container holder shown in FIG. 1.

Cupholder 10 includes a cover assembly 12 pivotally mounted to the forward edge 17 of armrest 11 as best seen in FIG. 4 in alignment with a forwardly facing open recess 16 therein. A pair of opposing arcuate arms 18 and 20 define in part a pair of container holding apertures 22 and 24 as seen in FIG. 2. Arms 18 and 20 are pivotally coupled to the cover assembly as described below. Opposing arms 18 and 20 are adapted to extend into a slot 32 in recess 16 into a compact storage position as cover assembly 12 is pivoted closed. Further, cover assembly 12 includes an exterior cover 34 that is adapted to cover recess 16 to provide an aesthetic modern appearance, as well as a functional cover for recess 16. Cover assembly 12 also includes an inner lower wall 102 (FIG. 5) that includes a container bottom support surface 80 that forms a coplanar container bottom support with mating container support surface 52 of receptacle 14 when container holder 10 (as best seen in FIG. 4) is in the open use position, thus forming a secure support for containers placed thereon.

Receptacle tray 14 (FIG. 5) includes a bottom or floor 40, rear wall 42, and sides 44 and 46 which define a forwardly facing open end 48. Rearward of forward open end 48 is a raised member 50 mounted on bottom 40 that extends substantially the width of recess 16 with the top surface 52 forming a container bottom support. Slot 32 is formed behind raised member 50, between member 50 and rear wall 42 and above bottom 40. Sides 44 and 46 extend forward of bottom 40 and are curved to define forward terminal ends 54 and 56 which conform to the curvature of armrest 11.

Cover 34 is also curved to conform to the front of the armrest and includes an outer arcuate wall 58 covered with upholstery material 59 to match the armrest. Cover 34 includes side edges 60 and 62, bottom edge 64, and top edge 66. An elongated hinge 68 pivotally connects cover assembly 12 at bottom edge 64 to open end 48 at the forward edge of recess bottom 40 so that cover assembly 12 can be pivoted between open and closed positions. In the closed position (FIG. 3), outer arcuate wall 58 mateably rests between and against recess sides 44 and 46 so as to enclose recess 16.

Cover assembly 12 (FIG. 5) also includes an inner upper cover 100 which overlies wall 102 and is attached to each other and to cover 34. Wall 102 includes a lower shelf 78 located on the inside thereof near to but spaced from bottom edge 64 of cover 34. Lower shelf 78 defines the second support surface 80 that aligns coplanar with support surface 52 of raised member 50 when cover assembly 12 is in the open position (FIG. 4) for providing bottom support for containers placed thereon.

Figure 6:
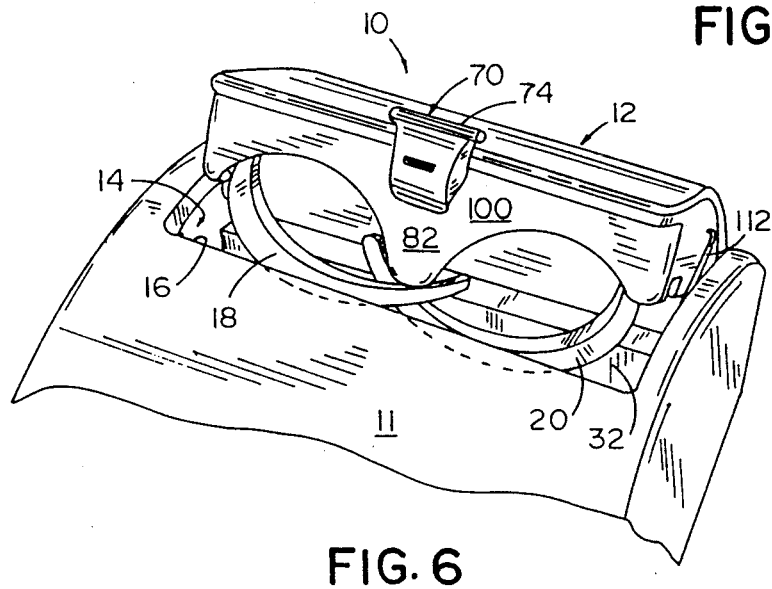
FIG. 6 is a perspective view of the container holder shown in FIG. 1, shown in a partially closed position.

The inner upper and lower members 100 and 102 of cover assembly 12 both include a rearwardly extending curved protrusion 82 with opposing laterally extending arcuate surfaces 84 and 86. Arcuate surfaces 84 and 86 extend substantially to the side edges 60 and 62 of cover assembly outer wall 58, and form a portion of container holding apertures 22 and 24. Arms 18 and 20 pivotally attach to cover assembly 12 near the outer ends of arcuate surfaces 84, 86 and between members 100 and 102. Arms 18 and 20 include a length having inner or second arcuate surfaces 88 and 90 that join with arcuate surface 84, 86 to define apertures 22 and 24. Arms 18 and 20 each include a pivot end 92 that is pivotally coupled to cover assembly 12 by vertically extending pivot pins 94 which pivotally fit within sockets 95 formed in wall 102 and top 100. Arms 18 and 20 further include a free end 96 oriented generally rearwardly and inwardly when cover assembly 12 is in the open position. Significantly, the distance from free ends 96 to cover portion 34 of cover assembly 12 is greater than the depth of slot 32. Thus, arms 18 and 20 must pivot to a collapsed stored position as the cover 34 is closed and arms 18 and 20 are pivoted into slot 32 (FIG. 6).

Free ends 96 terminate short of protrusion 82, and thus define an open section 98 (FIG. 2) which is useful for receiving a mug handle (not shown), or otherwise permitting a container placed therein to be easily removed. Resilient flaps 116 are secured between members 100 and 102 along arcuate surfaces 84 and 86 and extend into apertures 22 and 24 to provide for more secure retention of containers placed therein by engaging the container sides.

A releasable latch 70 is operably attached to upper member 100 and includes a catch 72 with a release button 74, and bias spring 76. As cover assembly 12 is pivotally closed, catch 72 engages a depression (not shown) in rear wall 42 of receptacle 14. As latch 70 is released by pressing release button 74, cover assembly 12 opens as discussed below. Notably, the positions of latch 70 and the depression it engages can be reversed, with latch 70 being positioned on rear wall 42 and the depression being positioned on upper member 100 of cover assembly 12.

Figure 5:
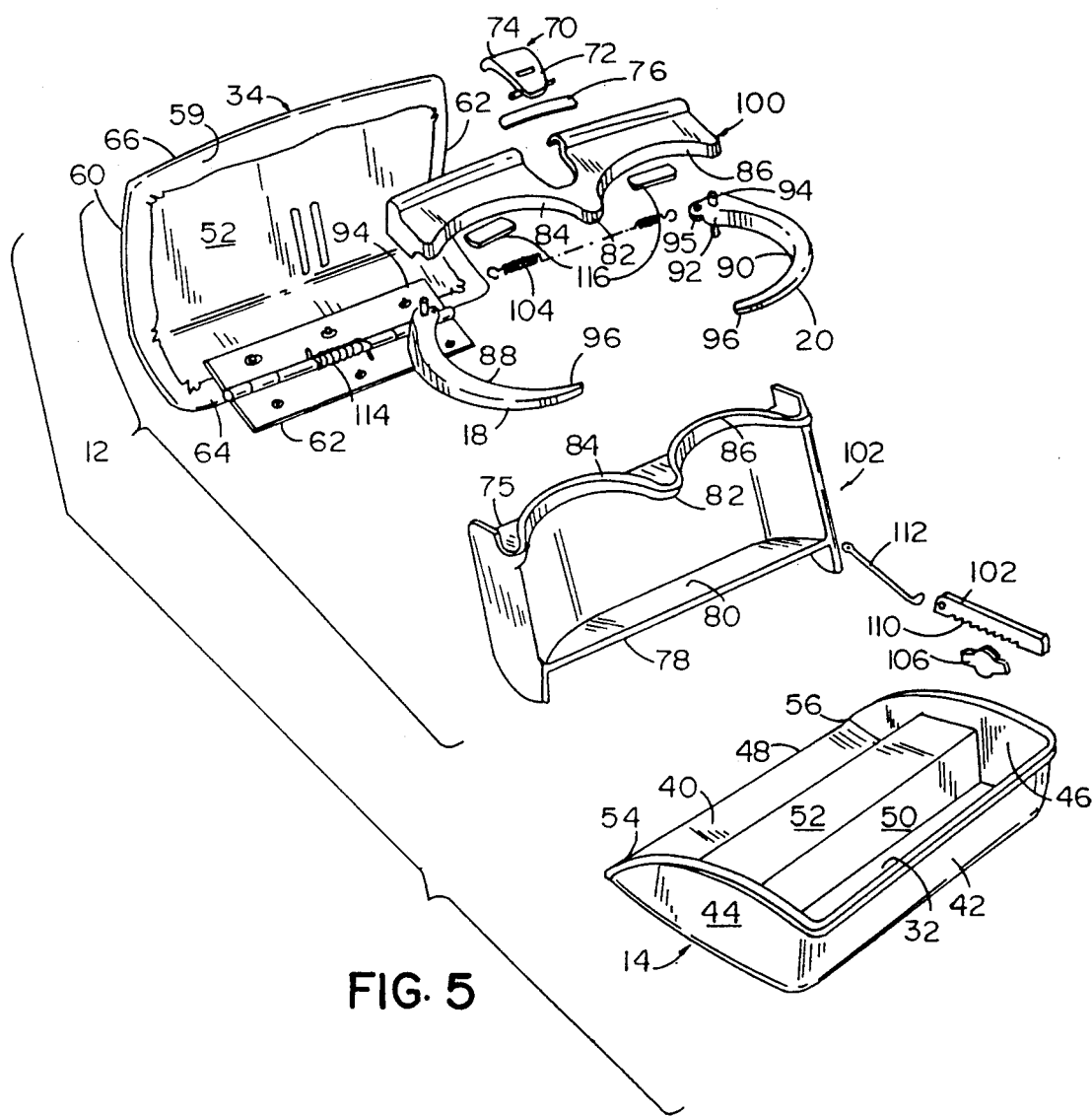
FIG. 5 is an exploded perspective view of the container holder shown in FIG. 1.

A bias spring 104 interconnects pivot ends 92 of arms 18 and 20 and is coupled at opposite ends to tabs 105 at the inner end of arms 18 and 20 on a side opposite pivot pins 94 from the curved surfaces 88 and 90. Spring 104 biases arms 18 and 20 to an outwardly extended use position. As cover assembly 12 and the cover 34 is pivoted toward the storage position in receptacle 14, the free ends 96 of arms 18 and 20 enter slot 32. As free ends 96 strike bottom 40, free ends 96 of the slightly vertically offset arms are forced to cross over each other (FIG. 6) toward a compact storage position (shown in FIG. 4, in phantom). Notably, spring 104 is in tension when cover assembly 12 is in the storage position, and biases cover assembly 12 against the holding force of latch 70. When latch 70 is released by pressing release button 74, spring 104 tends to force the cover open and arms 18 and 20 outwardly. The cover assembly 12 including cover 34 is also biased toward the fully open use position by a bias spring 114 associated with hinge 68 (FIG. 5). This pivoting motion of cover assembly 12 is dampened by rotary damper 106 (FIG. 5) to provide a smoother opening action. Damper 106 mounts to the receptacle wall 46, and is operably connected to cover assembly 12 by a gear rack 108 with teeth 110, and rod 112. Rod 112 pivotally connects to cover assembly 12 and rack 108 to allow cover assembly 12 to pivot properly. It is contemplated that the dampening motion can be accomplished in a number of ways. Further, it is contemplated that a spring (not shown) could be operably connected to rack 108 to bias cover assembly 12 to the use position instead of spring 114.

Figure 3:
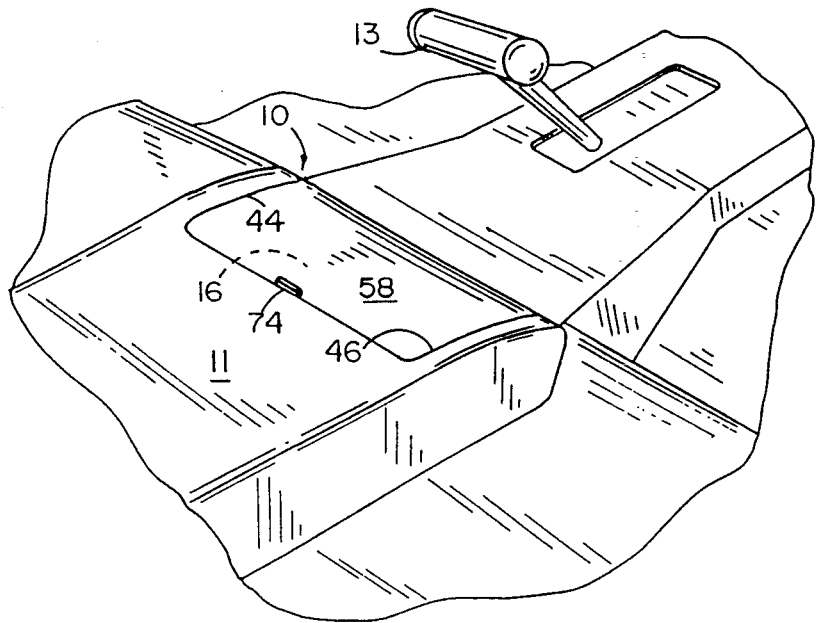
FIG. 3 is a perspective view of the container holder in FIG. 1 shown in a stored or closed position.

Container holder 10, when not in use will typically be in the closed stored position as shown in FIG. 3 and in phantom in FIG. 4. In this position cover assembly 12 is positioned over recess 16 with the upholstered cover 58 exposed to provide an aesthetic appearance to the stored holder. When an operator desires to use container holder 10, release button 74 is pressed and cover assembly 12 is pivoted forward to an open use position by bias spring 114. As cover assembly 12 is initially pivoted open, arms 18 and 20 are biased outwardly by bias spring 104 with arms 18 and 20 moving outwardly to form container holding apertures 22 and 24 with protrusion 82 of cover assembly 12. Also, support surface 80 on cover assembly 12 aligns with support surface 52 of recess 16 to form a coplanar container bottom support surface for containers placed in apertures 22, 24. Notably, free ends 96 of arms 18, 20 form an open section 98 with protrusion 82 to facilitate placement of mugs with handles therein, and also to facilitate grasping of any container placed therein. Also, any container placed in apertures 22 and 24 is partially protected by sides 42, 44 of recess 16 and is firmly supported by bottom container support surface 52 of recess 16.

Container holder 10 is closed by pivoting cover assembly 12 into recess 16. As cover assembly 12 is pivoted on hinge 68, the free ends 96 of arms 18, 20 move into slot 32 and engage bottom 40. This causes the vertically offset arms 18 and 20 to cross over each other (FIG. 6) and to move into a compact storage position in slot 32 (FIG. 4, in phantom). As cover assembly 12 including cover 34 finally closes recess 16, latch 70 engages rear wall 42 holding the cover in a closed position.

Thus, it is seen with the container holder of the present invention, a compact, convenient and self-contained container holder is provided for holding containers such as cups or mugs. The container holder includes a cover assembly pivotally mounted to an open recess with arms pivotally mounted in turn to the cover assembly for ease of movement between open and closed positions. In the preferred embodiment of the invention, the system is particularly shaped and adapted to be mounted in a relatively shallow recess in the front of an armrest located between the front seats of a vehicle, the container holder positions containers placed therein in a partially protected and securely supported location for easy access. It will become apparent to those skilled in the art that various modifications to the preferred embodiment of the invention can be made without departing from the spirit or scope thereof as defined by the appended claims.

The embodiments of the invention in which an exclusive property or privilege is claimed are defined as follows.

1. A container holder for a vehicle comprising:
a storage member mounted to a vehicle, said storage member having a recess and means defining a container holding aperture and a first container supporting surface located under said means for supporting a portion of the bottom of a container placed in said aperture;
a cover pivotally mounted to said storage member and movable between a storage position wherein said cover encloses said recess and a use position in which a portion of said cover defines a second container supporting surface located under said container holding aperture coplanar with said first supporting surface when said cover is in said use position for supporting a second portion of the bottom of the container.

2. The apparatus as defined in claim 1 including two opposing arms each having one end movably mounted to said cover and a second free end oriented generally in the direction of said recess, said arms movable on said cover in opposing directions, said arms defining a part of said container holding aperture when said cover is in said use position and being movable by collapsing to a compact overlapping storage position in said recess when said cover is pivoted to said storage position.

3. The apparatus as defined in claim 1 wherein said cover defines an axis of rotation located under said storage member when said cover is in said use position.

4. The apparatus as defined in claim 1 and further including opposing arms each having one end movably mounted to said cover and a second free end oriented generally in the direction of said recess, said arms laterally movable on said cover in opposing directions between a compact storage position in said recess when said cover is pivoted to said storage position, and an extended use position when said cover is in said use position, and wherein said cover includes a protrusion that defines first portions of first and second container holding apertures, and said arms define second portions of said first and second container holding apertures, respectively.

5. The apparatus as defined in claim 4 wherein said free ends of said arms are spaced from one another to define open sections for receiving a mug handle, said open sections being generally oriented toward said recess and adapted to position the mug handle in a protected but accessible location in said recess.

6. The apparatus as defined in claim 1 wherein said cover is mounted to said storage member by a spring-loaded hinge tending to urge said cover to an open position, and further including latch means for releasably holding said cover in a closed position.

7. The apparatus as defined in claim 6 and further including damping means extending between said cover and said storage member to control the motion of said cover.

8. The apparatus as defined in claim 1 wherein said storage member includes an armrest.

9. The apparatus as defined in claim 8 wherein said storage member includes a receptacle mounted in said recess, said receptacle including sides and a bottom defining a horizontally facing open end, said bottom forming said first container supporting surface at said open end.

10. The apparatus as defined in claim 9 wherein said cover portion includes a floor section extending toward said first container bottom support surface on said storage member and being coplanar therewith when said cover is in said use position for supporting the bottom of a container.

11. A container holder for a vehicle, comprising:
a member located between a passenger and driver seat of a vehicle, said member having a front end with a recess having a floor, said recess having a top opening located over said floor;
a cover pivotally mounted over said opening for movement between a closed position and an open position, the inside surface of said cover having a container holder mechanism defining at least one container holding means having an aperture extending over at least a portion of said floor when said cover is in said open position whereby the bottom surface of a container rests on said floor to at least partially support the bottom of a container placed in said aperture of said container holding means.

12. A container holder as defined in claim 3 wherein said container holding means includes moveable arms.

13. A container holder for a vehicle comprising:
a receptacle member mounted to a vehicle, said receptacle member including an open end, a first container support surface located in said receptacle member for supporting the bottom of a container, and sides for partially protecting the container;
a cover assembly pivotally mounted to said receptacle member adjacent said open end and movable between a closed storage position wherein said cover assembly covers at least a portion of said open end and an open use position, means located on said cover assembly for defining a container holding aperture for holding a container therein, said cover assembly including a second container support surface that aligns coplanar with said first support surface, said first and second container support surfaces being located under said container holding aperture when said cover assembly is in said use position ,whereby a container placed in said container holding aperture is partially supported by said container support surface on said receptacle member and partially supported by said second container support surface of said cover assembly.

14. The apparatus as defined in claim 13 wherein said means further defines a second container holding aperture, and said cover assembly further includes a protrusion that defines a first portion of said first and second container holding apertures, and said means further includes rearwardly facing arms that define second portions of said first and second container holding apertures, respectively.

15. The apparatus as defined in claim 14 wherein said first and second apertures each include an open section adapted to receive a mug handle, said open sections being generally oriented toward said recess and adapted to position the mug handle in a protected but accessible location in said recess.

16. A container holder for a vehicle comprising:
a receptacle member mounted to a vehicle, said receptacle member including an open end, a first container support surface located in said receptacle member for supporting the bottom of a container, and sides for partially protecting the container;

a cover assembly pivotally mounted to said receptacle member adjacent said open end and movable between a closed storage position wherein said cover assembly covers at least a portion of said open end and an open use position, means located on said cover assembly for defining at least one container holding aperture for holding a container therein, said cover assembly including a second container support surface that aligns coplanar with said first support surface to provide a container support under said container holding aperture when said cover assembly is in said use position, whereby a container placed in said at least one container holding aperture is partially directly supported by said container support surface on said receptacle member and partially supported by said second container support surface of said cover assembly to provide a support for the bottom of the container;

said means further defining a second container holding aperture, and said cover assembly further including a protrusion that defines a first portion of said first and second container holding apertures, and said means further including rearwardly facing arms that define second portions of said first and second container holding apertures, respectively;

said first and second apertures each including an open section adapted to receive a mug handle, said open sections being generally oriented toward said recess and adapted to position the mug handle in a protected but accessible location in said recess; and said receptacle member including a slot having a predetermined depth and wherein said arms are of a length defining a first dimension from said cover assembly greater than said predetermined depth of said slot, said arms being positioned on said cover assembly so that said free ends fit into said slot with said arms engaging said slot as said cover assembly is pivoted toward a closed position such that said arms are forced into a compact storage position in said slot.

17. The apparatus as defined in claim 16 wherein said slot is oriented vertically and below said first container support surface.

18. A container holder for a vehicle comprising:
a receptacle member mounted to a vehicle, said receptacle member defining a vertical slot with sides defining an internal depth;
a cover assembly pivotally mounted to said receptacle member and movable between a storage position and a use position;
a pair of opposing arms each having a first end movably mounted to said cover assembly, a second free end generally oriented toward said recess, and a length defining a portion of at least one container holding aperture, said length of said arms defining a first dimension from said cover assembly greater than said internal depth of said slot, said arms being positioned on said cover assembly so that said free ends fit into said slot with said arm lengths engaging said slot as said cover assembly is pivoted toward a closed position, said arms being forced into a compact storage position in said slot whereas said first dimension is reduced as said cover assembly is moved into said closed position.

19. The apparatus as defined in claim 18 wherein said cover assembly includes a protrusion with opposing sides that define first portions of a first and a second container holding aperture, respectively and said pair of opposing arms define second portions of said first and second container holding apertures, respectively, said first and second container holding apertures each including an open section adapted to receive a mug handle and position same generally toward said receptacle member in a partially protected position.

20. The apparatus as defined in claim 18 wherein said receptacle member includes a container supporting surface for supporting a container placed in said container holding apertures.

21. The apparatus as defined in claim 18 wherein said recess includes vertically extending sides adapted to partially protect the container placed in said aperture.

22. A container holder for a vehicle, comprising:
a receptacle member adapted to be mounted in an armrest, said receptacle member including a recess with a floor, a horizontally and vertically open end and a vertical slot therein;
a cover assembly pivotally mounted to said receptacle member in said recess adjacent said open end, said cover assembly movable between a closed position wherein said cover assembly covers said recess and an open position for use; and
arms pivotally attached to said cover assembly, said arms defining at least one container holding aperture over said open end when said cover assembly is in said open position so that said floor at least partially supports the container placed in said container holding aperture and said recess at least partially protects the container and said arms, and wherein said arms fold into a compact storage position in said slot when said cover assembly is moved to said closed position, said arms moving orthogonally to the direction of pivotal movement of said cover assembly.

23. A container holder for a vehicle comprising:
a storage member mounted to a vehicle, said storage member having a recess and means defining a container holding aperture and a first container supporting surface for supporting at least a portion of the bottom of a container;
a cover pivotally mounted to said storage member and movable between a storage position wherein said cover encloses said recess and a use position in which a portion of said cover defines a second container supporting surface for supporting the bottom of a container;
opposing arms each having one end movably mounted to said cover and a second free end oriented generally in the direction of said recess, said arms laterally movable on said cover in opposing directions between a compact storage position in said recess when said cover is pivoted to said storage position, and an extended use position when said cover is in said use position, and wherein said cover includes a protrusion that defines first portions of first and second container holding apertures, and said arms define second portions of said first and second container holding apertures, respectively; and
said storage member further including a vertical slot for receiving said arms as said cover is pivotally moved to said closed position.

24. The apparatus as defined in claim 23 including means for biasing said arms outwardly when said cover is in said use position.

* * * * *

UNITED STATES PATENT AND TRADEMARK OFFICE
CERTIFICATE OF CORRECTION

PATENT NO. : 5,318,343
DATED : June 7, 1994
INVENTOR(S) : David J. Spykerman et al.

It is certified that error appears in the above-indentified patent and that said Letters Patent is hereby corrected as shown below:

In the Abstract, line 1;
    After "support" insert --member--.

Signed and Sealed this

Thirteenth Day of December, 1994

*Attest:*

BRUCE LEHMAN

*Attesting Officer*   *Commissioner of Patents and Trademarks*